| United States Patent [19] | [11] | 4,237,035 |
|---|---|---|
| Kanagawa et al. | [45] | Dec. 2, 1980 |

[54] EPOXY RESIN FROM BY-PRODUCT TAR FROM RESORCINOL PROCESS AND USE THEREOF

[75] Inventors: Shuichi Kanagawa; Kazunori Kawakami, both of Osaka; Akira Shintani, Toyonaka, all of Japan

[73] Assignee: Sumitomo Chemical Company, Limited, Osaka, Japan

[21] Appl. No.: 42,956

[22] Filed: May 29, 1979

[30] Foreign Application Priority Data

Jun. 2, 1978 [JP] Japan .................................. 53-66999

[51] Int. Cl.$^3$ .............................................. C08G 59/06
[52] U.S. Cl. ............................ 260/28 R; 260/348.15; 260/348.64; 528/87; 528/98; 528/101; 528/104
[58] Field of Search .................. 528/87, 98, 101, 104; 260/348.15, 348.64, 28 R

[56] References Cited

U.S. PATENT DOCUMENTS

| 3,133,033 | 5/1964 | St. Clair et al. | 260/28 |
|---|---|---|---|
| 3,388,086 | 6/1968 | Doerge et al. | 260/28 |

*Primary Examiner*—Earl A. Nielsen
*Attorney, Agent, or Firm*—Stevens, Davis, Miller & Mosher

[57] ABSTRACT

An epoxy resin useful for coatings, adhesives and molding materials which is derived from a by-product tar produced as by-product in manufacturing resorcinol or resorcinol and hydroquinone via hydroperoxide of m-diisopropylbenzene or of a combination of m- and p-diisopropylbenzenes and containing m-substituted phenolic constituents or a combination of m- and p-substituted phenolic constituents as major constituents, or is derived from a polymerization product of said by-product tar.

6 Claims, No Drawings

EPOXY RESIN FROM BY-PRODUCT TAR FROM RESORCINOL PROCESS AND USE THEREOF

This invention relates to an epoxy resin derived from a by-product tar which is produced as by-product in manufacturing resorcinol or resorcinol and hydroquinone via hydroperoxide of m-diisopropylbenzene or of a combination of m- and p-diisopropylbenzenes (hereinafter referred to as m,p-diisopropylbenzene) and which contains m-substituted phenolic constituents or a combination of m- and p-substituted phenolic constituents (hereinafter referred to as m,p-substituted phenolic constituents) as major constituents, or derived from a polymerization product of said by-product tar, and further relates to uses of said epoxy resin.

The tar produced as by-product (hereinafter referred to as by-product tar) in manufacturing resorcinol or resorcinol and hydroquinone via hydroperoxide of m-diisopropylbenzene or of m,p-diisopropylbenzene contains m-substituted phenolic constituents or m,p-substituted phenolic constituents as major constituents. Among these constituents, m- or p-isopropenylphenol, -isopropylphenol, -hydroxyphenyldimethylcarbinol, -hydroxyacetophenone, -acetylphenyldimethylcarbinol, -diisopropenylbenzene, and dimers and higher oligomers of m- or p-isopropenylphenol have been identified.

Now, the by-product tar has heretofore been scarcely utilized effectively, being disposed of by burning or used at most as a supplement to fuel.

Under the circumstances, the present inventors conducted extensive studies on the effective utilization of the above-said by-product tar and, as a result, found that epoxy resins derived from the by-product tar are very useful for coatings, adhesives, molding materials and the like.

An object of this invention is to provide an epoxy resin obtained by reacting a by-product tar which is obtained as by-product in manufacturing resorcinol or resorcinol and hydroquinone via hydroperoxide of m-diisopropylbenzene or m,p.-diisopropylbenzene and which contains m-substituted phenolic constituents or m,p-substituted phenolic constituents as main constituents, or a polymerization product of said by-product tar with an epihalohydrin in the presence of an alkali; a resin composition, cured product thereof, and a coating material containing said epoxy resin; and to provide processes for the production of substances listed above.

As mentioned above, the by-product tar used in this invention is that produced as by-product in manufacturing resorcinol or resorcinol and hydroquinone via hydroperoxide of m-diisopropylbenzene or m,p-diisopropylbenzene and contains m-substituted phenolic constituents or m,p-substituted phenolic constitutents. Examples of the compositions are as shown in Table 1. The composition, however, varies according to the conditions under which resorcinol or resorcinol and hydroquinone are produced, and it is needless to say that other by-product tars than those having the compositions as exemplified in Table 1 can likewise be used.

A by-product tar stripped of a part or whole of the distillable componentsor that removed of high molecular weight components may also be used as an equivalent of the by-product tar as herein defined.

TABLE 1

|  | By-product tar [I] (%) | By-product tar [II] (%) | By-product tar [III] (%) | By-product tar [IV] (%) | By-product tar [V] (%) | By-product tar [VI] (%) |
| --- | --- | --- | --- | --- | --- | --- |
| m-Isopropenylphenol | 5 | 17 | 23 | — | — | — |
| m,p-Isopropenylphenol | — | — | — | 2 | 7 | 12 |
| m-Isopropylphenol | 21 | 7 | 8 | — | — | — |
| m,p-Isopropylphenol | — | — | — | 20 | 6 | 7 |
| m-Hydroxyphenyldimethyl-carbinol | 10 | 8 | 10 | — | — | — |
| m,p-Hydroxyphenyldimethyl-carbinol | — | — | — | 11 | 9 | 11 |
| m-Hydroxyacetophenone | 1 | 3 | 2 | — | — | — |
| m,p-Hydroxyacetophenone | — | — | — | 1 | 3 | 2 |
| m-Acethylphenyldimethyl-carbinol | 3 | 5 | 6 | — | — | — |
| m,p-Acethylphenyldimethyl-carbinol | — | — | — | 3 | 5 | 5 |
| m-Diisopropenylbenzene | 6 | 4 | 4 | — | — | — |
| m,p-Diisopropenylbenzene | — | — | — | 5 | 4 | 4 |
| Dimer of m-isopropenylphenol | 23 | 27 | 15 | — | — | — |
| Dimer of m,p-isopropenyl-phenol | — | — | — | 25 | 32 | 19 |
| Others (resinous substance) | 31 | 29 | 32 | 33 | 34 | 40 |

In preparing the epoxy resin of this invention, the by-product tar or the polymerization product of the by-product tar, which, if necessary, has been stripped of low boiling constituents, is allowed to react with an epihalohydrin in the presence of an alkali in the following manner which is similar to that of the preparation of conventional epoxy resins: After addition of an epihalohydrin to the by-product tar or the polymerization product in an amount of 0.6 to 10 moles per one hydroxyl group contained in the by-product tar or the polymerization product, the resulting mixture is allowed to undergo the dehalogenation ring closure reaction in the presence of an alkali.

The epihalohydrin generally used is epichlorohydrin, though other epihalohydrins such as epibromohydrin, methylepichlorohydrin, and the like can also be used.

The alkalis used in the above reaction are, for example, caustic alkalis such as sodium hydroxide and potassium hyroxide and other alkali metal salts such as sodium silicate, sodium aluminate, and sodium zincate.

In this invention, when the amount used of an epihalohydrin exceeds 1 mole per one hydroxyl group contained in the by-product tar or polymerization product, a semisolid or solid epoxy resin of low molecular weight is obtained by dissolving the by-product tar or polymerization product in the epihalohydrin or in a solution of the epihalohydrin in a water soluble solvent such as acetone or methanol, then, if necessary, replacing the air with nitrogen, adding the alkali in the form of solid or concentrated solution in an amount equivalent to one hydroxyl group or in some excess, then allowing the reaction to proceed at 20° to 120° C., and removing the water and salt which are formed as by-products. On the other hand, when the amount of an epihalohydrin is 1 mole or less per one hydroxyl group in the by-product tar or polymerization product, a solid epoxy resin of high molecular weight is obtained by dissolving the by-product tar or polymerization product in an aqueous solution containing a low concentration of an alkali in an amount somewhat greater than equivalent to one mole of the epihalohydrin or in said solution admixed with a waterimmiscible solvent such as toluene, xylene, methyl isobutyl ketone, or methyl ethyl ketone, then adding the epihalohydrin to the resulting solution, allowing the reaction to proceed at 20° to 120° C., and removing the water and salt formed as by-products.

It is also possible that in the reaction with the epihalohydrin, an addition catalyst such as a tertiary amine can be added to the reaction system to form an addition product which is then allowed to undergo dehalogenation ring closure reaction in the presence of an alkali, to produce an epoxy resin.

Further, it is also possible to use in place of the by-product tar or polymerization product a mixture of the by-product tar or polymerization product with other suitable polyhydric phenols such as, for example, bis(4-hydroxypehnyl)dimethylmethane, bis(4-hydroxyphenyl)methane, resorcinol, hydroquinone, and novolak resin.

In preparing the polymerization product of said by-product tar, polymerization of the by-product tar is carried out usually at 20° to 240° C. in the presence or absence of a solvent. Although the polymerization proceeds by heating only and a polymerization initiator is not always necessary, yet the use of an initiator is advantageous in accelerating the rate of polymerization.

The polymerization initiators suitable for the purpse are those generally used in cationic polymerization. Examples of such initiators include inorganic acids and salts such as hydrochloric acid, sulfuric acid, phosphoric acid, and potassium hydrogensulfate, solid acids such as silica-alumina, acid clay, and activated clay, organic acids such as formic acid, oxalic acid, mono-, di-, and tri-chloroacetic acid, benzenesulfonic acid, and p-toluenesulfonic acid, phosphorus halides such as phosphorus trichloride, phosphorus pentachloride and phosphorus oxychloride, and Friedel-Crafts' catalysts such as aluminum chloride, iron chloride, zinc chloride, and magnesium chloride.

The polymerization is carried out favorably at a temperature of 100° to 240° C. in the absence of any solvent. A temperature above 240° C., at which temperature thermal decomposition of the formed polymerizate sets in, should be avoided.

In using the polymerization initiator, although not subject to any specific restriction, the amount generally adopted is 0.01 to 20% by weight based on the weight of the by-product tar.

The softening point of the solid resinous product obtained by the polymerization of such a by-product tar can be varied in accordance with the purpose of the intended use by controlling the amount of catalyst, temperature and other polymerization conditions, but is generally 50° to 120° C.

The polymerization can be carried out in the absence of solvents by selecting such a reaction temperature at which the reaction products remain in the liquid state or, alternatively, in the presence of non-polar solvents such as benzene, toluene, xylene and chlorobenzene.

When the polymerization is carried out under an atmosphere of inert gases such as nitrogen, there are obtained reaction products of improved color.

The epoxy resin obtained according to this invention can be used as a curable resin composition in the fields of coatings, architectural and construction materials, adhesives, and electric machines and appliances by curing with curing agents such as aliphatic polyamines, cycloaliphatic polyamines, aromatic polyamines, cyanoethylated polyamines, glycidyl ether-polyamine aducts, polyamides, polybasic carboxylic acids or anhydrides thereof, metal halides of the Friedel-Crafts type, and phenol-formaldehyde precondensate, similarly to common epoxy resins of bisphenol type. A preferred use is in coating materials and architectural and construction materials, particularly the tar-epoxy type coating material. The tar-epoxy type coating material comprising the present epoxy resin can be applied effectively for protective coatings in the marine and industrial maintenance field.

The epoxy resin of this invention can be used, if necessary, in combination with other known epoxy resins such as, for example, polyglycidl ether of polyhydric phenols or polyhydric alchols, epoxidized fatty acids and derivatives thereof, epoxidized diene polymers, cyclohexene epoxide derivatives, and cyclopentadiene epoxide.

The epoxy resin of this invention can be modified by the reaction with common epoxy modifying agents.

The invention is illustrated below with reference to Examples, but the invention is not limited thereto.

EXAMPLE 1

Into a reactor provided with a thermometer, stirrer, dropping funnel, and water recovery device, were charged 250 parts by weight of by-product tar (I) having a hydroxyl equivalent of 250 and 462.5 parts by weight of epichlorohydrin. To the mixture, while being boiled, was added dropwise with stirring 87.5 parts by weight of 48% aqueous sodium hdyroxide solution over a period of 2 hours while removing water from the reaction system. The reaction mixture was freed from sodium chloride by filtration and the filtrate was concentrated to obtain 310 parts by weight of a brown epoxy resin in the form of semi-solid having an epoxy equivalent of 369.

EXAMPLE 2

In a rector provided with a thermometer and a stirrer, was placed 300 parts by weight of by-product tar (I). While being stirred, the by-product tar was kept at a temperature of 180° C. After 8 hours, the polymerization mixture was freed from low-boiling components by evaporation to obtain 280 parts by weight of a brown resinous product (softening point, 80° C.; hydroxyl equivalent, 280). Epichlorohydrin was allowed to react in the same manner as in Example 1, except that 280 parts by weight of the resinous product obtained above was used. There were obtained 330 parts by weight of an epoxy resin, brown in color, having a softening point of 50° C. and an epoxy equivalent of 380.

EXAMPLE 3

Into a reactor provided with a thermometer, stirrer, dropping funnel and reflux condenser, was charged 600 parts by weight of by-product tar (II). To the by-product tar, while being stirred and heated at 120° to 130° C, was added dropwise 6 parts by weight of 10% sulfuric acid over a period of 30 minutes. After completion of the reaction and neutralization with 4.9 parts by weight of 10% aqueous sodium hydroxide solution, the polymerization mixture was freed from low-boiling components by evaporation to obtain 570 parts by weight of a brown resinous product (softening point, 85° C; hydroxyl equivalent, 270). Epichlorohydrin was allowed to react in the same manner as in Example 1, except that 270 parts by weight of the above resinous product was used. There were obtained 325 parts by weight of a brown epoxy resin having a softening point of 53° C. and an epoxy equivalent of 377.

EXAMPLE 4

By using the epoxy resins obtained in Examples 1, 2 and 3 and, for comparison, "Sumi-Epoxy" ELA-134 and ESA-011 (bisphenol A-based epoxy resins having epoxy equivalents of 250 and 470, respectively, produced by Sumitomo Chemical Co.), tar-epoxy coatings of the compositions shown in Table 2 were prepared. The coatings were applied by means of a bar coater to a dull mild steel sheet. After having been left standing at room temperature for one day and then cured at 80° C. for one hour, the coating layer was tested for physical properties. The results obtained were as shown in Table 3.

TABLE 2

| | | Tar-Epoxy coating composition | | | | |
|---|---|---|---|---|---|---|
| | | This invention | | | Comparative Example | |
| No. | | 1 | 2 | 3 | 4 | 5 |
| Epoxy resin used (epoxy equivalent) | | Ex. 1 (369) | Ex. 2 (380) | Ex. 3 (377) | Sumi-epoxy ELA-134 (250) | Sumi-epoxy ESA-011 (470) |
| Main component | Epoxy resin | 40 | 40 | 40 | 40 | 40 |
| | Toluene: n-butanol = 1:1 | 5/5 | 5/5 | 5/5 | 5/5 | 5/5 |
| Curing agent | Tar[1] | 47 | 47 | 47 | 67 | 47 |
| | Sumicure P-740[2] | 7 | 7 | 7 | 20 | 7 |
| | Sumicure D[3] | 4.7 | 4.7 | 4.7 | 6 | 4.7 |
| | Xylene | 10 | 10 | 10 | 5 | 10 |

Note:
[1]BITU-RESIN UPX-100; product of Usagida Chemical Co.
[2]A polyamide-based curing agent; amine value, 340; Sumitomo Chemical Co.
[3]2,4,6-Tris(dimethylaminomethyl)phenol; Sumitomo Chemical Co.

TABLE 3

| | Physical properties of coating layer (50–70 μ thickness) | | | | |
|---|---|---|---|---|---|
| | This invention | | | Comparative Example | |
| No. | 1 | 2 | 3 | 4 | 5 |
| Pencil hardness | H | 2H | 2H | 5B | 5B |
| Bending resistance (mm) | 10 | 10 | 10 | 6 | 10 |
| Du Pont impact resistance (with backing; kg-cm) | 10–25 | 10–25 | 10–25 | 10–25 | 5 |
| Erichsen test (mm) | >8 | >8 | >8 | >8 | 1 |
| Peel test (cross cut, adhesive tape) (number of peices) | 100/100 | 100/100 | 100/100 | 100/100 | 70–90/100 |
| Salt resistance, 5% NaCl | Salt spray (10 days) (width peeled with adhesive tape) | 10–15 | 10–15 | 10–15 | x | 10–20 |
| | Salt immersion (1 month) | ⊚ | ○ | ○ | x | ○ |
| Chemical resistance | 5% NaOH (10 days) | ⊚ | ○ | ○ | Δ | ○ |
| | 5% HCl (1 day) | ○ | ○ | ○ | Δ | Δ |
| | Kerosene (20 days) | ○ | ○ | ○ | Δ | ○ |

Note:
Rating:
⊚ excellent;
○ good;
Δ some blisters;
x many blisters.

EXAMPLE 5

Into a reactor provided with a thermometer, stirrer, dropping funnel, and reflux condenser, were charged 270 parts by weight of the solid resinous product obtained in Example 3, 440 parts by weight of 10% aqueous sodium hydroxide solution, and 300 parts by weight of methyl isobutyl ketone. While stirring, 92.5 parts by weight of epichlorohydrin was added and the mixture was refluxed at 95° to 100° C. for 90 minutes to allow the reaction to proceed. The reaction mixture was freed from sodium chloride by washing with water and then concentrated to obtain 306 parts by weight of a brown epoxy resin having a softening point of 87° C. and an epoxy equivalent of 1,700.

Using the epoxy resin obtained above and, for comparison, Sumi-epoxy ESA-017 (a bisphenol A-based epoxy resin having an epoxy equivalent of 1,900; a product of Sumitomo Chemical Co.), curing tests were performed in a manner similar to that in Example 4. It was found that the resin of this invention exhibited better physical properties of the coating layer.

What is claimed is:
1. An epoxy resin obtained by reacting a by-product tar, which is produced as by-product in manufacturing resorcinol or resorcinol and hydroquinone via the hydroperoxide of m-diisopropylbenzene or of a combination of m- and p-diisopropylbenzenes and which contains m-substituted phenolic constituents or a combination of m- and p-substituted phenolic constituents as major constitutents, or a polymerization product of said by-product tar with an epihalohydrin in the presence of an alkali.

2. An epoxy resin according to claim 1, wherein the epihalohydrin is epichlorohydrin, epibromohydrin or methylepichlorohydrin.

3. An epoxy resin according to claim 1, wherein the amount of the epihalohydrin is 0.6 to 10 moles per one hydroxyl group contained in the by-product tar or the polymerization product of said by-product tar.

4. A curable resin composition containing an epoxy resin according to claim 1 and a curing agent.

5. A tar-epoxy coating composition comprising a mixture of the epoxy resin of claim 1 and a bituminous tar.

6. A cured product obtained by curing a composition according to claim 4 or 5.

* * * * *